(12) United States Patent
Tang et al.

(10) Patent No.: US 10,057,720 B2
(45) Date of Patent: Aug. 21, 2018

(54) METHOD AND DEVICE FOR PROVIDING OBJECT-FINDING INFORMATION

(71) Applicant: Xiaomi Inc., Beijing (CN)

(72) Inventors: Mingyong Tang, Beijing (CN); Tao Chen, Beijing (CN); Huayijun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/193,272

(22) Filed: Jun. 27, 2016

(65) Prior Publication Data

US 2017/0006425 A1    Jan. 5, 2017

(30) Foreign Application Priority Data

Jul. 1, 2015    (CN) .......................... 2015 1 0378756

(51) Int. Cl.
| | |
|---|---|
| *H04W 4/02* | (2018.01) |
| *G08B 13/14* | (2006.01) |
| *G08B 21/24* | (2006.01) |
| *H04W 4/021* | (2018.01) |
| *H04M 1/725* | (2006.01) |
| *H04W 4/80* | (2018.01) |
| *G08B 21/02* | (2006.01) |

(52) U.S. Cl.
CPC ............ *H04W 4/025* (2013.01); *G08B 13/14* (2013.01); *G08B 21/24* (2013.01); *H04M 1/7253* (2013.01); *H04W 4/021* (2013.01); *H04W 4/023* (2013.01); *H04W 4/027* (2013.01); *H04W 4/80* (2018.02); *G08B 13/1427* (2013.01); *G08B 21/0202* (2013.01)

(58) Field of Classification Search
CPC .................................. G08B 13/14; H04W 4/02
USPC ............................................ 455/456.1–456.6
See application file for complete search history.

(56) References Cited

U.S. PATENT DOCUMENTS

| | | | |
|---|---|---|---|
| 8,144,199 B2* | 3/2012 | Takenaka ................ | G06T 7/254 |
| | | | 348/169 |
| 9,357,348 B2* | 5/2016 | Evans .................... | H04W 4/023 |
| 2008/0291031 A1 | 11/2008 | Chen et al. | |
| 2011/0175722 A1 | 7/2011 | Jensen et al. | |

(Continued)

FOREIGN PATENT DOCUMENTS

| | | |
|---|---|---|
| CN | 101052190 A | 10/2007 |
| CN | 201830255 U | 5/2011 |

(Continued)

OTHER PUBLICATIONS

English version of the International Search Report of PCT/CN2015/098681, mailed from the State Intellectual Property Office of China dated Mar. 15, 2016.

(Continued)

*Primary Examiner* — Michael T Vu
(74) *Attorney, Agent, or Firm* — Finnegan, Henderson, Farabow, Garrett & Dunner LLP (57) ABSTRACT

The present disclosure relates to a method and device for providing object-finding information. The method is performed in an electronic device for finding an object and includes: when detecting that a preset loss event occurs, detecting device-relevant information of a surrounding device located around the electronic device; and sending the detected device-relevant information, as object-finding information, to a preset device.

17 Claims, 6 Drawing Sheets

(56) References Cited

U.S. PATENT DOCUMENTS

| | | | |
|---|---|---|---|
| 2012/0312250 A1* | 12/2012 | Jesurum | A01K 15/023 119/721 |
| 2013/0157686 A1* | 6/2013 | Wu | H04W 64/00 455/456.1 |
| 2014/0213301 A1 | 7/2014 | Evans et al. | |

FOREIGN PATENT DOCUMENTS

| | | | |
|---|---|---|---|
| CN | 102833674 | A | 12/2012 |
| CN | 103167400 | A | 6/2013 |
| CN | 103841514 | A | 6/2014 |
| CN | 203912041 | U | 10/2014 |
| CN | 104469934 | A | 3/2015 |
| CN | 104581627 | A | 4/2015 |
| CN | 105100222 | A | 11/2015 |
| JP | 2000-287265 | A | 10/2000 |
| JP | 2001-237950 | A | 8/2001 |
| JP | 2005-122705 | A | 5/2005 |
| JP | 2007-235823 | A | 9/2007 |
| JP | 2012-100231 | A | 5/2012 |
| JP | 2013-135260 | A | 7/2013 |
| JP | 2014-7587 | A | 1/2014 |
| KR | 10-2013-0116144 | A | 10/2013 |

OTHER PUBLICATIONS

Extended European Search Report of European Patent Application No. 16169479.9, from the European Patent Office, dated Nov. 22, 2016.

* cited by examiner

METHOD AND DEVICE FOR PROVIDING OBJECT-FINDING INFORMATION

CROSS-REFERENCE TO RELATED APPLICATIONS

This application is based upon and claims priority to Chinese Patent Application No. 201510378756.4, filed Jul. 1, 2015, the entire contents of which are incorporated herein by reference.

TECHNICAL FIELD

The present disclosure generally relates to the field of electronic technology and, more particularly, to a method and device for providing object-finding information.

BACKGROUND

With the development of electronic technology, various electronic devices with new functions keep emerging. For example, an electronic device with a loss prevention function can provide relevant information for finding a missing or stolen personal item. Such an electronic device may be an anti-loss device, a mobile phone, or the like.

The information for finding a missing or stolen personal item, (herein referred to as "object-finding information,") is usually the location information of the item. Taking an anti-loss device as an example, the conventional method for providing object-finding information is as follows. The anti-loss device is attached onto an item. The anti-loss device locates the item and transmits the location information to the owner of the item, so that the owner can find the item according to the location information. However, if the anti-loss device is damaged, the anti-loss device can no longer update the location information in real time, and therefore cannot effectively assist the owner in finding the missing item.

SUMMARY

According to a first aspect of the present disclosure, there is provided a method performed in an electronic device for finding an object, comprising: when detecting that a preset loss event occurs, detecting device-relevant information of a surrounding device located around the electronic device; and sending the detected device-relevant information, as object-finding information, to a preset device.

According to a second aspect of the present disclosure, there is provided an electronic device for finding an object, comprising: a processor; and a memory for storing instructions executable by the processor; wherein the processor is configured to: when it is detected that a preset loss event occurs, detect device-relevant information of a surrounding device located around the electronic device; and send the detected device-relevant information, as object-finding information, to a preset device.

According to a third aspect of the present disclosure, there is provided a non-transitory computer-readable storage medium storing instructions that, when executed by a processor of an electronic device, causes the electronic device to perform a method for finding an object, the method comprising: when detecting that a preset loss event occurs, detecting device-relevant information of a surrounding device located around the electronic device; and sending the detected device-relevant information, as object-finding information, to a preset device.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

Figure 1:
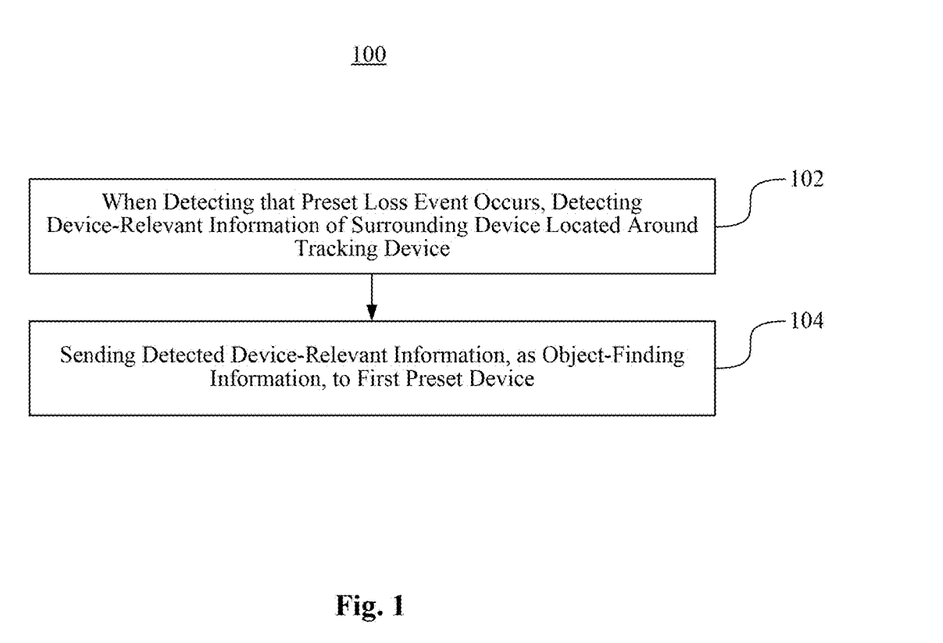
FIG. 1 is a flowchart of a method for providing object-finding information, according to an exemplary embodiment.

FIG. 1 is a flowchart of a method 100 for providing object-finding information, according to an exemplary embodiment. The object-finding information is used for locating a missing object. The missing object may be an item, a pet, or a person.

For example, the method 100 is performed in an electronic device (hereinafter referred to as "tracking device") that has a loss prevention function. The tracking device may be a mobile terminal, such as a mobile phone, a tablet computer, and the like. The tracking device may also be an anti-loss device. The tracking device includes a processor, a memory, and a transceiver. As described in more detail below, the processor is configured to process a detected abnormal event, the memory is configured to store data required and/or produced by the processor during the processing of the abnormal event, and the transceiver is configured to receive data from and send data to one or more other devices. Referring to FIG. 1, the method 100 includes the following steps.

In step 102, when the tracking device detects that a preset loss event occurs, the tracking device detects device-relevant information of a surrounding device located around the tracking device.

In step 104, the tracking device sends the detected device-relevant information, as the object-finding information, to a first preset device.

According to the method 100, when it is detected that a preset loss event occurs, the tracking device detects device-relevant information of a surrounding device, and sends the detected device-relevant information, as the object-finding information, to a first preset device. The object-finding information reported in this manner is not the location information of the tracking device itself. Therefore, even if the tracking device is damaged, the missing object can still be found according to the reported device-relevant information of the surrounding device. Accordingly, the method 100 improves the effectiveness of the provided object-finding information. The detailed implementation of the method 100 is described next.

In the implementation of the method 100, a user may install in the tracking device an application for providing object-finding information. The user attaches the tracking device to an object to be tracked. For example, the object may be a personal item (e.g., a bike), a pet, or a child. When the object is missing, the user obtains the object-finding information through the tracking device.

Referring to step 102, the tracking device is preset with one or more loss events associated with the object to which the tracking device is attached. When detecting that a loss event occurs, the tracking device detects the device-relevant information of a surrounding device located around the tracking device. The surrounding device is capable of accessing a wireless network. For example, the surrounding device may be a mobile phone, a vehicle chip, etc.

In some embodiments, the device-relevant information of the surrounding device includes one or more of: the network identity of a wireless local area network established by the surrounding device, a Media Access Control (MAC) address of the surrounding device, a Bluetooth identity of the surrounding device, and account information of an instant messaging application installed in the surrounding device.

Figure 2:
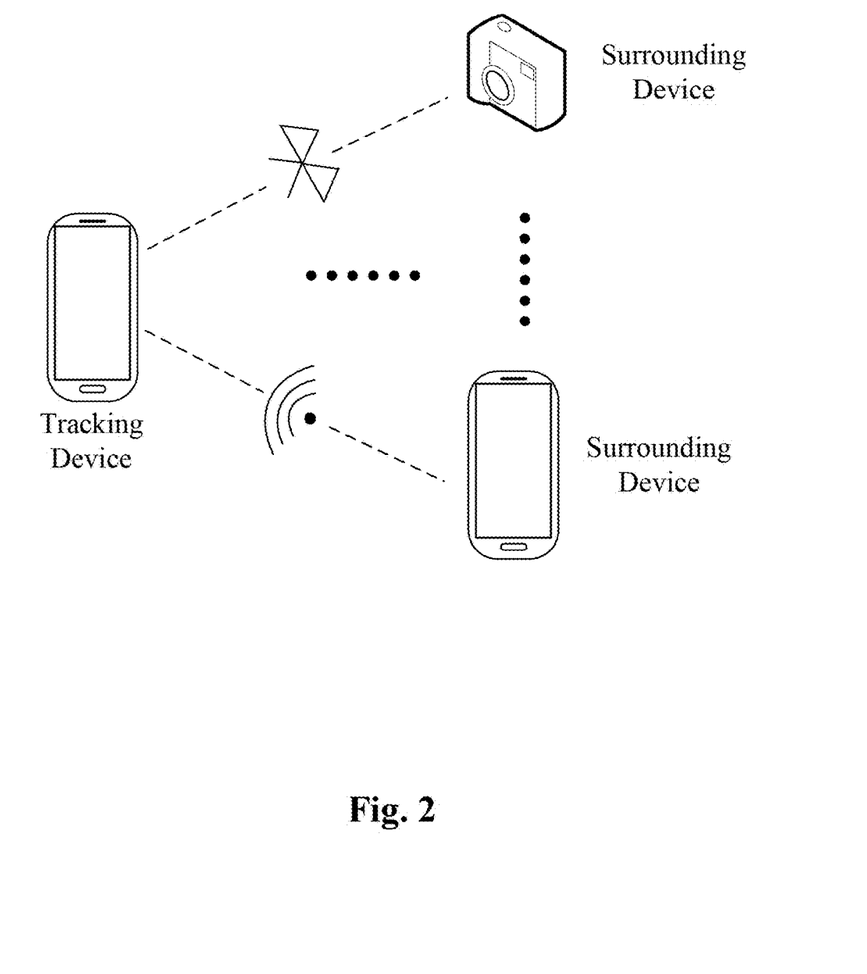
FIG. 2 is a schematic diagram illustrating an implementation of a method for providing object-finding information, according to an exemplary embodiment.

FIG. 2 is a schematic diagram illustrating an implementation of the method 100 (FIG. 1), according to an exemplary embodiment. As shown in FIG. 2, the tracking device is capable of accessing a wireless network. For example, the tracking device may have a Wireless Fidelity (WiFi) function, and obtain the network identity of a wireless local area network established by the surrounding device. The tracking device may also obtain the MAC address of the surrounding device. As another example, the tracking device may have a Bluetooth function, and obtain the Bluetooth identity of the surrounding device. The Bluetooth identity may be the MAC address of a Bluetooth component in the surrounding device, or the name of the Bluetooth connection established by the surrounding device. As yet another example, the tracking device may be installed with an instant messaging application that has a function for searching nearby friendly devices. The tracking device obtains, through the instant messaging application, the current account information of an instant messaging application installed in the surrounding device.

In exemplary embodiments, various preset loss events are used to trigger the obtaining of the device-relevant information of the surrounding device. Accordingly, step 102 may be implemented in various manners.

In one embodiment, when detecting that the tracking device leaves a first preset area, the tracking device detects the device-relevant information of the surrounding device.

Figure 3:
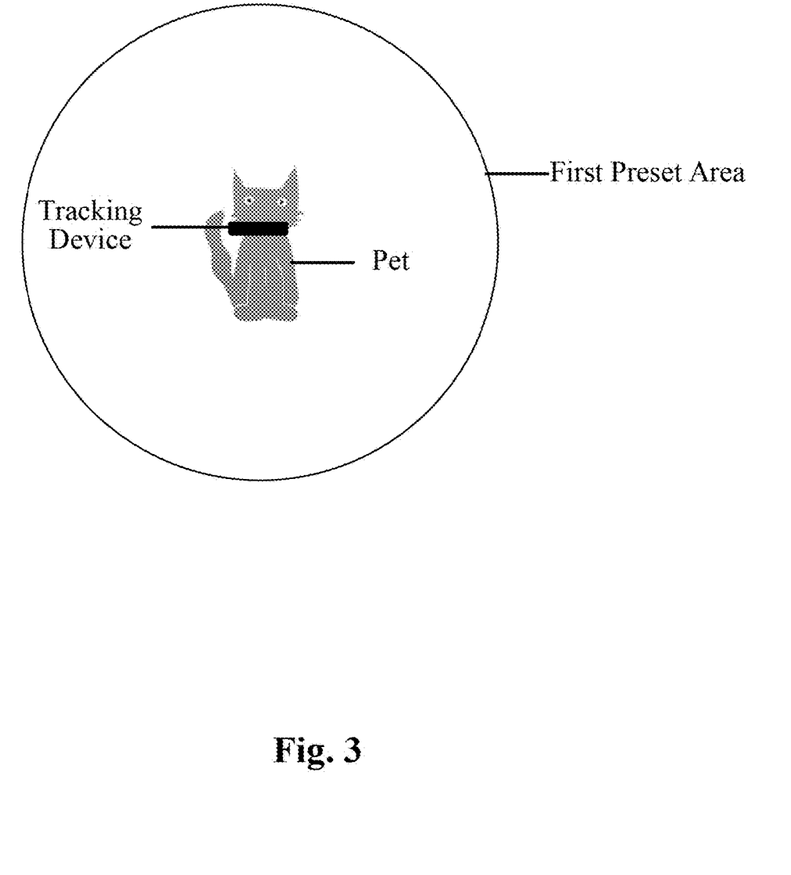
FIG. 3 is a schematic diagram illustrating an implementation of a method for providing object-finding information, according to an exemplary embodiment.

For example, the tracking device uses a positioning system to continuously detect the location information of the tracking device. When the tracking device detects that the tracking device moves away from the first preset area, the tracking device initiates the detection of the device-relevant information of the surrounding device. FIG. 3 is a schematic diagram illustrating an implementation of the method 100 (FIG. 1), according to an exemplary embodiment. As shown in FIG. 3, the tracking device is a collar worn by a pet. When the pet moves beyond a preset area, the tracking device detects the device-relevant information of a surrounding device, such as the network identity of a wireless local area network established by the surrounding device.

In another embodiment, when detecting that a distance between the tracking device and a second device exceeds a first preset distance, the tracking device detects the device-relevant information of the surrounding device.

Figure 4:
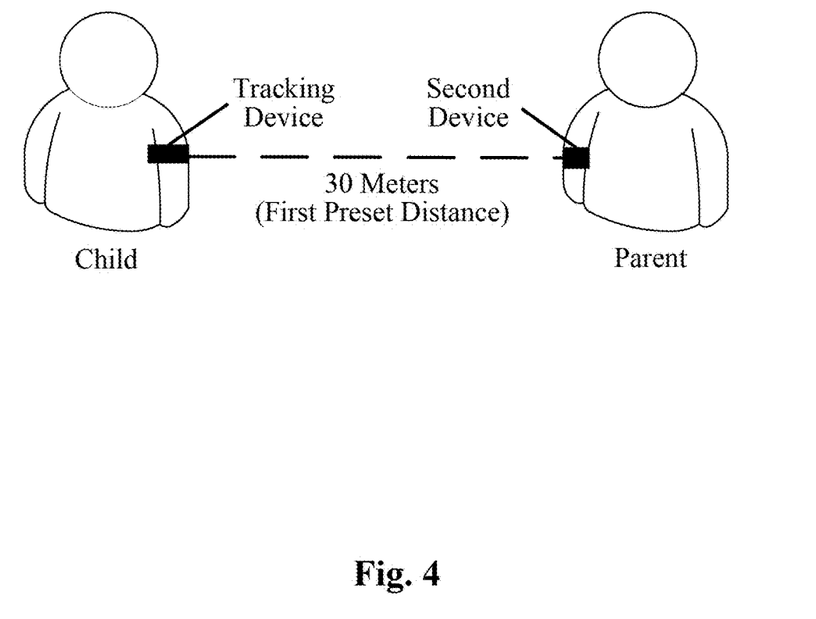
FIG. 4 is a schematic diagram illustrating an implementation of a method for providing object-finding information, according to an exemplary embodiment.

For example, the second device may be the surrounding device whose device-relevant information is detected. FIG. 4 is a schematic diagram illustrating an implementation of the method 100 (FIG. 1), according to an exemplary embodiment. As shown in FIG. 4, the tracking device is worn by a child. The tracking device monitors the distance between the tracking device and a device used by a parent of the child. When the distance between the tracking device and the parent's device exceeds a preset distance, for example, 30 meters, the tracking device detects the device-relevant information of a device surrounding the tracking device (i.e., surrounding the child).

In another embodiment, when detecting that information input by a user for unlocking a screen of the tracking device does not match preset screen-unlocking information, the tracking device detects device-relevant information of the surrounding device.

For example, the preset screen-unlocking information may be a password for unlocking the screen of the tracking device. When a user wants to unlock the screen to use the tracking device, the user enters a password. If the user-entered password does not match the preset screen-unlocking password, the tracking device detects the device-relevant information of the surrounding device.

In another embodiment, when receiving an instruction for shutting down the tracking device, the tracking device detects the device-relevant information of the surrounding device.

For example, a thief stealing the tracking device may want to shut down the tracking device to prevent the object from being found. The tracking device is configured to, when a shut-down instruction is received, detect the device-relevant information of the surrounding device.

In another embodiment, if the tracking device is attached to an object locked by a lock, the tracking device monitors the locking state of the lock. When the tracking device detects that the lock is not open, but the object moves and the moving distance exceeds a preset distance, the tracking device initiates the detection of the device-relevant information of a surrounding device. For example, the tracking device is attached to a bike locked with a lock. When the bike is stolen by a thief, the tracking device detects that the lock is not open but the bike moves. In this case, the tracking device initiates the detection of the device-relevant information of a surrounding device.

Occasionally, a thief stealing the tracking device may attempt to flash the tracking device. "Flash" or "flashing" as used herein refers to the overwriting of existing firmware or data stored in a memory (e.g., a read-only memory or a flash memory) of the tracking device. In one embodiment, when receiving an instruction for flashing the tracking device, the tracking device detects the device-relevant information of a surrounding device. The tracking device then performs the following process: sending flashing backup information to a server, the flashing backup information including the detected device-relevant information and information indicating that the tracking device is in a stolen state; after the flashing is completed, obtaining the flashing backup information from the server; and when determining that the flashing backup information includes information indicating the tracking device is in a stolen state, detecting again the device-relevant information of a surrounding device.

Specifically, when a thief stealing the object performs a flashing operation on the tracking device, the tracking device receives the flashing instruction. At this time, the tracking device initiates the detection of the device-relevant information of a surrounding device. Moreover, if the tracking device determines that the object is stolen, the tracking device sets itself in a stolen state, and sends, according to a pre-stored server address, flashing backup information to a server. The flashing backup information includes the detected device-relevant information of the surrounding device and the information indicating that the tracking device is in the stolen state. After the flashing operation is completed, the tracking device sends the server a request for obtaining the flashing backup information. Responding to the request, the server sends the flashing backup information to the tracking device. The tracking device receives and parses the flashing backup information. If the flashing backup information includes information indicating the stolen state of the tracking device, the tracking device determines that the tracking device is stolen, and detects again the device-relevant information of a surrounding device. As described in more detail below, the device-relevant information detected before and after the flashing operation is later compared to determine the object-finding information that needs to be reported to the first preset device.

In some embodiments, when a preset loss event occurs, the tracking device continuously detects the device-relevant information of the surrounding device. For example, the tracking device continuously detects, at a preset time interval, the device-relevant information of the surrounding device.

Referring to step 104, the tracking device sends the detected device-relevant information, as the object-finding information, to a first preset device. The first preset device may be a server. Alternatively, the first preset device may be a terminal carried by a user, for example, a mobile phone.

In exemplary embodiments, the tracking device may send the detected device-relevant information of a surrounding device to the first preset device directly. Alternatively, the tracking device may send the detected device-relevant information to a server first. The server obtains additional valuable information based on the device-relevant information, and then sends the obtained information and/or the device-relevant information to the first preset device. The server may obtain the additional information in various ways, which are described in detail below.

In one embodiment, the server determines a moving route of the object. Specifically, as the tracking device is moving together with the object, the tracking device periodically detects the device-relevant information of the surrounding devices along the moving route, and sends the detected device-relevant information to the server. The server determines location information of each detected surrounding device along the moving route according to the device-relevant information, and further determines the moving route according to the location information of the surrounding devices. The server reports the determined moving route to the first preset device.

For example, the tracking device detects the device-relevant information of a plurality of surrounding devices located along the moving route. According to the pre-stored server address, the tracking device periodically sends the detected device-relevant information of the surrounding devices to the server. For example, the device-relevant information may be the network identity of a wireless local area network established by a surrounding device. The server pre-stores a corresponding relationship between the device-relevant information of one or more surrounding devices and the location information of the respective surrounding devices. After receiving the device-relevant information of a surrounding device, the server determines the location information of the surrounding device according to the pre-stored corresponding relationship. This way, the server determines the location information of each detected surrounding device along the moving route of the tracking device. The server then determines the moving route of the tracking device (i.e., the moving route of the object) according to the location information of the detected surrounding devices, and sends the moving route to the first preset device. The first preset device may be a mobile terminal carried by a user, such as a mobile phone.

In another embodiment, the server obtains images captured by one or more cameras along the moving route of the object. Specifically, the tracking device sends the server the detected device-relevant information of a surrounding device and the point in time when the device-relevant information is detected, collectively as the object-finding information. The server determines location information of the surrounding device according to the device-relevant information, obtains an image captured by a camera at the location of the surrounding device and at the point in time when the device-relevant information is detected, and sends the image to the first preset device.

For example, after a loss event occurs, the tracking device continuously detects the device-relevant information of the surrounding devices along the moving route of the tracking device, and sends the detected device-relevant information and the points in time of detecting such device-relevant information, collectively as the object-finding information, to the server. The server receives and parses the object-finding information. The server pre-stores a corresponding relationship between the device-relevant information of one or more surrounding devices and the location information of the respective surrounding devices. Based on the pre-stored corresponding relationship and the device-relevant information, the server determines the location information of each detected surrounding device. Subsequently, based on the location information of each detected surrounding device, the server obtains one or more images captured by a camera at the location of each detected surrounding device. The server may obtain the images from traffic monitoring servers, community monitoring servers, and/or building surveillance servers. Furthermore, based on the object-finding information, the server particularly obtains the image(s) captured by the camera at the point in time when the device-relevant information of the respective surrounding device is detected. These image(s) may show the suspected thieves. The server sends the image(s) to the first preset device. For example, after a pet is stolen, the tracking device obtains the network identity of a wireless local area network established by a surrounding device along the moving route of the pet, and detects a point in time when the device-relevant information is detected. The tracking device sends the above information, as the object-finding information, to the server. The server determines the location of the wireless local area network, i.e., the detected surrounding device, and obtains an image captured by a camera at the location of the surrounding device and at the point in time when the device-relevant information is detected. The tracking device performs the above image-obtaining process for each detected surrounding device in the moving route of the pet. The tracking device then sends the obtained images to the first preset device.

In some embodiments, the performance of step 104 is conditioned on the occurrence of a report triggering event. That is, step 102 further includes: when detecting a preset report triggering event, sending the detected device-relevant information, as the object-finding information, to the first preset device.

For example, the report triggering events may include one or more of the following: the tracking device moves away from a second preset area; a distance between the tracking device and a second device exceeds a second preset distance; or the tracking device continuously detects the same device-relevant information within a preset time period. The uses of these report triggering events are described in detail as follows.

In one embodiment, the tracking device uses a locating system, such as a Global Positioning System, to continuously detect the location information of the tracking device. When the tracking device detects that it moves away from the second preset area, the tracking device sends the detected device-relevant information to the first preset device.

In another embodiment, the tracking device detects the distance between the tracking device and a second device. When detecting that the distance exceeds the second preset distance, the tracking device sends the detected device-relevant information to the first preset device. For example, the second preset distance between a tracking device attached to a pet and an electronic device carried by an owner of this pet is 20 meters. When the tracking device detects that the distance between the pet and the electronic device carried by the owner exceeds 20 meters, the tracking device sends the detected device-relevant information to the first preset device.

In yet another embodiment, when the tracking device continuously detects the same device-relevant information within a preset time period, the tracking device sends the detected device-relevant information to the first preset device. For example, if a bike is stolen, the mobile phone of the thief moves together with the tracking device. When the tracking device continuously detects the device-relevant information of the mobile phone (e.g., the Bluetooth identity of the mobile phone) within a preset time period (e.g., one minute), the tracking device sends the device-relevant information of the mobile phone as the object-finding information to the first preset device. This way, even if the tracking device is damaged, the first preset device can still find the lost bike based on the device-relevant information of the thief's mobile phone.

As described above, in some embodiments, if the tracking device is flashed, the tracking device detects the device-relevant information of the surrounding device before and after the flashing operation. Accordingly, step 104 further includes: if the device-relevant information detected before and after the flashing are the same, sending the detected device-relevant information to the first preset device.

Specifically, after the completion of the flashing operation, the tracking device obtains the flashing backup information from the server. The flashing backup information includes the device-relevant information of a surrounding device detected before the flashing operation. The tracking device also detects again the device-relevant information of a surrounding device. The tracking device compares the device-relevant information detected before and after the flashing operation. If the device-relevant information detected before and after the flashing operation are the same, the tracking device sends the device-relevant information as the object-finding information to the first preset device.

Figure 5:
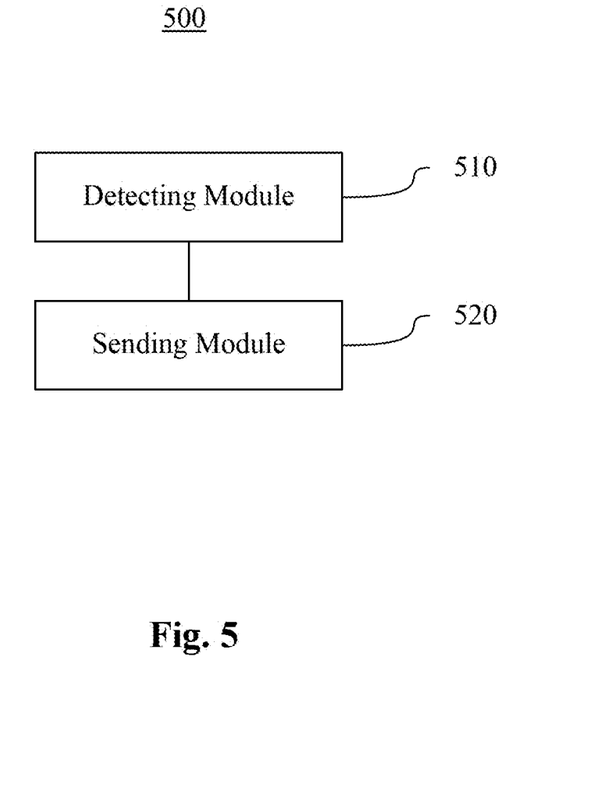
FIG. 5 is a block diagram of a device for providing object-finding information, according to an exemplary embodiment.

FIG. 5 is a block diagram of a device 500 for providing object-finding information, according to an exemplary embodiment. As shown in FIG. 5, the device 500 may be an electronic device including a detecting module 510 and a sending module 520. The device 500 is attached to an object to be tracked.

The detecting module 510 is configured to, when it is detected that a preset loss event occurs, detect device-relevant information of a surrounding device located around the electronic device.

The sending module 520 is configured to send the detected device-relevant information, as the object-finding information, to a first preset device.

In some embodiments, the preset loss events recognized by the detecting module 510 include one or more of the following: the device 500 moves away from a first preset area; a distance between the device 500 and a second device exceeds a first preset distance; the information input by a user for unlocking a screen of the device 500 does not match preset screen-unlocking information; or an instruction for shutting down the device 500 is received by the device 500.

In some embodiments, the detecting module 510 is further configured to continuously detect, at a preset time interval, the device-relevant information of a surrounding device of the device 500. The sending module 520 is further configured to send the detected device-relevant information, as the object-finding information, to a server. The server determines the location information of each surrounding device based on the respective device-relevant information, determines the moving route of the device 500 (i.e., the object) based on the location information, and reports the moving route to the first preset device.

In some embodiments, the sending module 520 is further configured to, when a preset report triggering event is detected, send the detected device-relevant information to the first preset device. The preset report triggering event includes one or more of the following: the device 500 moves away from a second preset area; a distance between the device 500 and a second device exceeds a second preset distance; or the detecting module 510 continuously detects the same device-relevant information within a preset time period.

In some embodiments, the detecting module 510 is further configured to, when an instruction for flashing the device 500 is received, detect the device-relevant information of a surrounding device. The sending module 520 is further configured to send flashing backup information to a server. The flashing backup information includes the device-relevant information detected when the flashing instruction is received, and information indicating that the device 500 is in a stolen state.

In some embodiments, the detecting module 510 is further configured to: after the flashing is completed, obtain the flashing backup information from the server; and when it is determined that the flashing backup information includes the information indicating the device 500 is in the stolen state, detect again the device-relevant information of a surrounding device. The sending module 520 is further configured to, if the device-relevant information detected before and after the flashing operation are the same, send the device-relevant information as the object-finding information to the first preset device.

In some embodiments, the sending module 520 is further configured to send the object-finding information to a server. The object-finding information includes the device-relevant information of a surrounding device and a point in time when the device-relevant information is detected. The server determines location information of the surrounding device according to the device-relevant information, obtains an image captured by a camera at the location of the detected surrounding device and at the point in time when the device-relevant information is detected, and sends the obtained image to the first preset device.

In exemplary embodiments, the device relevant information of the surrounding device includes one or more of: the network identity of a wireless local area network established by the surrounding device, a MAC address of the surrounding device, a Bluetooth identity of the surrounding device, and the account information of an instant messaging application installed in the surrounding device.

With respect to the devices described in the above embodiments, the specific ways for performing operations by individual modules therein have been described in detail in the embodiments regarding the methods, which will not be repeated here.

It is understood that the above described modules can each be implemented by hardware, or software, or a combination of hardware and software. It is also understood that multiple ones of the above described modules may be combined as one module, and each of the above described modules may be further divided into a plurality of sub-modules.

Figure 6:
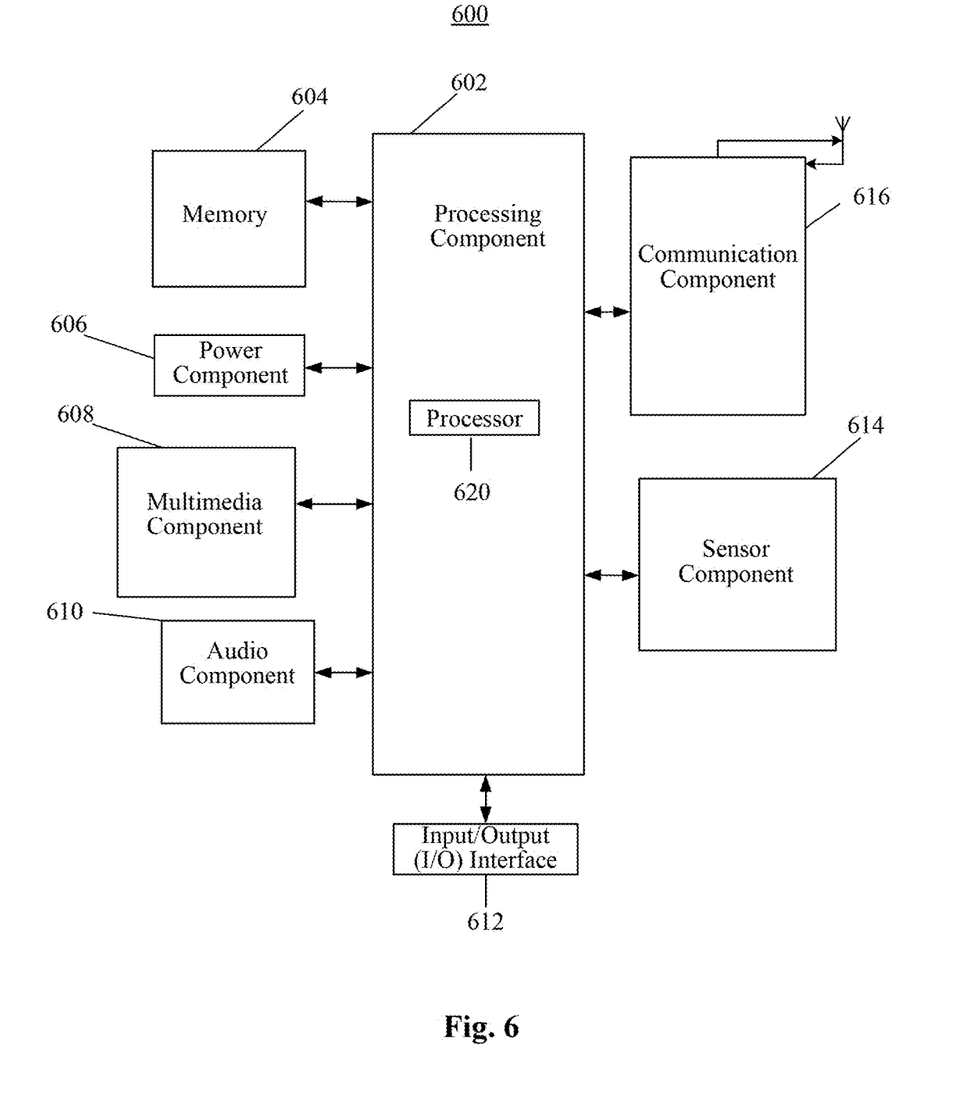
FIG. 6 is a block diagram of an electronic device for providing object-finding information, according to an exemplary embodiment.

FIG. 6 is a block diagram of an electronic device 600 for providing object-finding information, according to an exemplary embodiment. For example, the electronic device may be a mobile phone. Referring to FIG. 6, the electronic device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the electronic device 600, such as the operations associated with display, telephone calls, data communications, camera operations, and recording operations. The processing component 602 may include one or more processors 602 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the electronic device 600. Examples of such data include instructions for any applications or methods operated on the electronic device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the electronic device 600. The power component 606 may include a power management system, one or more power sources, and any other components associated with the generation, management, and distribution of power in the device 600.

The multimedia component 608 includes a screen providing an output interface between the electronic device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive external multimedia data while the electronic device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the electronic device 600 is in an operation mode, such as a call mode, a recording mode, and a voice recognition mode. The received audio signal may be further stored in the memory 604 or transmitted via the communication component 616.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the electronic device 600. For instance, the sensor component 614 may detect an open/closed status of the electronic device 600, relative positioning of components, e.g., the display and the keypad, of the electronic device 600, a change in position of the electronic device 600 or a component of the electronic device 600, a presence or absence of user contact with the electronic device 600, an orientation or an acceleration/deceleration of the electronic device 600, and a change in temperature of the electronic device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the electronic device 600 and other devices. The electronic device 600 can access a wireless network based on a communication standard, such as WiFi, 2G, 3G, 4G, or a combination thereof. In one exemplary embodiment, the communication component 616 receives a broadcast signal or broadcast associated information from an external broadcast management system via a broadcast channel In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 602 in the electronic device 600, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method performed by an electronic device, comprising:
   when detecting that a preset loss event associated with an object occurs, detecting device-relevant information of a surrounding device located around the electronic device, the electronic device being attached to the object, the surrounding device being detached from the electronic device and configured to access a wireless network; and
   sending the detected device-relevant information, as object-finding information for locating the object, to a preset device;
   wherein when the preset loss event is receiving by the electronic device an instruction for flashing the electronic device, the method further comprising:
      in response to receiving the instruction for flashing the electronic device, detecting first device-relevant information of the surrounding device;
      sending flashing backup information to a server, the flashing backup information including the first device-relevant information and information indicating that the electronic device is in a stolen state;
      after the flashing is completed, obtaining the flashing backup information from the server;
      when determining that the flashing backup information includes the information indicating that the electronic device is in the stolen state, detecting second device-relevant information of the surrounding device; and
      when the first device-relevant information and the second device-relevant information are the same, sending the second device-relevant information, as the object-finding information, to the preset device.

2. The method according to claim 1, wherein the preset device is a first preset device, and the preset loss event includes at least one of:
   the electronic device moves away from a preset area;
   a distance between the electronic device and a second preset device exceeds a preset distance;
   screen-unlocking information input by a user into the electronic device does not match preset screen-unlocking information; or
   an instruction for shutting down the electronic device is received.

3. The method according to claim 1, wherein the detecting of the device-relevant information of the surrounding device located around the electronic device comprises:
   continuously detecting, at a preset time interval, the device-relevant information of the surrounding device.

4. The method according to claim 3, wherein the sending of the detected device-relevant information, as the object-finding information for locating the object, to the preset device comprises:
   sending the device-relevant information detected at the preset time interval, as the object-finding information, to a server,
   wherein the server determines location information of the surrounding device based on the device-relevant information, determines a moving route of the object based on the location information, and reports the moving route of the object to the preset device.

5. The method according to claim 1, wherein the sending of the detected device-relevant information, as the object-finding information for locating the object, to the preset device comprises:
   when detecting a preset report triggering event, sending the detected device-relevant information, as the object-finding information, to the preset device.

6. The method according to claim 5, wherein the preset device is a first preset device, and the preset report triggering event includes at least one of:
   the electronic device moves away from a preset area;
   a distance between the electronic device and a second preset device exceeds a preset distance; or
   the electronic device continuously detects same device-relevant information within a preset time period.

7. The method according to claim 1, wherein the sending of the detected device-relevant information, as the object-finding information for locating the object, to the preset device comprises:
   sending to a server the detected device-relevant information of the surrounding device and a point in time at which the device-relevant information is detected,
   wherein the server determines a location of the surrounding device based on the device-relevant information, obtains an image captured at the point in time by a camera at the location of the surrounding device, and sends the image to the preset device.

8. The method according to claim 1, wherein the device-relevant information of the surrounding device includes at least one of:
a network identity of a wireless local area network established by the surrounding device, a media access control address of the surrounding device, a Bluetooth identity of the surrounding device, or account information of an instant messaging application installed in the surrounding device.

9. An electronic device, comprising:
a processor; and
a memory for storing instructions executable by the processor;
wherein the processor is configured to:
when the electronic device is attached to an object and it is detected that a preset loss event associated with the object occurs, detect device-relevant information of a surrounding device located around the electronic device, the surrounding device being detached from the electronic device and configured to access a wireless network; and
send the detected device-relevant information, as object-finding information for locating the object, to a preset device; and
wherein, when the preset loss event is receiving by the electronic device an instruction for flashing the electronic device, the processor is further configured to:
in response to receiving an instruction for flashing the electronic device, detect first device-relevant information of the surrounding device;
send flashing backup information to a server, the flashing backup information including the first device-relevant information and information indicating that the electronic device is in a stolen state;
after the flashing is completed, obtain the flashing backup information from the server;
when it is determined that the flashing backup information includes the information indicating that the electronic device is in the stolen state, detect second device-relevant information of the surrounding device; and
when the first device-relevant information and the second device-relevant information are the same, send the second device-relevant information, as the object-finding information, to the preset device.

10. The electronic device according to claim 9, wherein the preset device is a first preset device, and the preset loss event includes at least one of:
the electronic device moves away from a preset area;
a distance between the electronic device and a second preset device exceeds a preset distance;
screen-unlocking information input by a user into the electronic device does not match preset screen-unlocking information; or
an instruction for shutting down the electronic device is received.

11. The electronic device according to claim 9, wherein the processor is further configured to:
continuously detect, at a preset time interval, the device-relevant information of the surrounding device.

12. The electronic device according to claim 11, wherein the processor is further configured to:
send the device-relevant information detected at the preset time interval, as the object-finding information, to a server,
wherein the server determines location information of the surrounding device based on the device-relevant information, determines a moving route of the object based on the location information, and reports the moving route of the object to the preset device.

13. The electronic device according to claim 9, wherein the processor is further configured to:
when it is detected that a preset report triggering event occurs, send the detected device-relevant information, as the object-finding information, to the preset device.

14. The electronic device according to claim 13, wherein the preset device is a first preset device, and the preset report triggering event includes at least one of:
the electronic device moves away from a preset area;
a distance between the electronic device and a second preset device exceeds a preset distance; or
the electronic device continuously detects same device-relevant information within a preset time period.

15. The electronic device according to claim 9, wherein the processor is further configured to:
send to a server the detected device-relevant information of the surrounding device and a point in time at which the device-relevant information is detected,
wherein the server determines a location of the surrounding device based on the device-relevant information, obtains an image captured at the point in time by a camera at the location of the surrounding device, and sends the image to the preset device.

16. The electronic device according to claim 9, wherein the device-relevant information of the surrounding device includes at least one of:
a network identity of a wireless local area network established by the surrounding device, a media access control address of the surrounding device, a Bluetooth identity of the surrounding device, or account information of an instant messaging application installed in the surrounding device.

17. A non-transitory computer-readable storage medium storing instructions that, when executed by a processor of an electronic device, cause the electronic device to perform a method for finding the object, the method comprising:
when detecting that a preset loss event associated with an object occurs, detecting device-relevant information of a surrounding device located around the electronic device, the electronic device being attached to the object, the surrounding device being detached from the electronic device and configured to access a wireless network; and
sending the detected device-relevant information, as object-finding information for locating the object, to a preset device;
wherein when the preset loss event is receiving by the electronic device an instruction for flashing the electronic device, the method further comprising:
in response to receiving the instruction for flashing the electronic device, detecting first device-relevant information of the surrounding device;
sending flashing backup information to a server, the flashing backup information including the first device-relevant information and information indicating that the electronic device is in a stolen state;
after the flashing is completed, obtaining the flashing backup information from the server;
when determining that the flashing backup information includes the information indicating that the electronic device is in the stolen state, detecting second device-relevant information of the surrounding device; and when the first device-relevant information and the second device-relevant information are the same, sending the second device-relevant information, as the object-finding information, to the preset device.

\* \* \* \* \*